United States Patent [19]
Seo

[11] Patent Number: 6,036,095
[45] Date of Patent: Mar. 14, 2000

[54] DATA SYMBOL READER WITH OBSERVATION WINDOW

[75] Inventor: Shuzo Seo, Tokyo, Japan

[73] Assignee: Asahi Kogaku Kogyo Kabushiki Kaisha, Tokyo, Japan

[21] Appl. No.: 08/858,765

[22] Filed: May 19, 1997

[30] Foreign Application Priority Data

May 17, 1996 [JP] Japan ................................ 8-148230

[51] Int. Cl.⁷ .................................................. G06K 7/10
[52] U.S. Cl. ................ 235/472.01; 235/454; 235/462.45
[58] Field of Search .................................. 235/472, 454, 235/456, 462, 485, 472.01, 472.03, 462.42, 462.43, 462.45; 250/221, 566, 239; 359/216

[56] References Cited

U.S. PATENT DOCUMENTS

| | | | |
|---|---|---|---|
| 3,961,198 | 6/1976 | Aungst | 250/566 |
| 4,251,798 | 2/1981 | Swartz et al. | 235/462 X |
| 4,626,925 | 12/1986 | Toyoda | 358/285 |
| 4,800,257 | 1/1989 | Johner | 235/472 |
| 4,800,444 | 1/1989 | Suzuki et al. | 358/294 |
| 4,809,351 | 2/1989 | Abramovitz et al. | 235/474 X |
| 4,847,484 | 7/1989 | Kikuchi | 250/221 |
| 5,019,918 | 5/1991 | Kubota et al. | 358/473 |
| 5,032,022 | 7/1991 | Sato et al. | 353/69 |
| 5,121,226 | 6/1992 | Kubota et al. | 358/473 |
| 5,192,856 | 3/1993 | Schaham | 235/462 |
| 5,200,598 | 4/1993 | Rencontre | 235/472 |
| 5,428,212 | 6/1995 | Tani et al. | 235/472 |
| 5,500,516 | 3/1996 | Durbin | 235/472 |
| 5,504,317 | 4/1996 | Takahashi | 235/462 |
| 5,510,607 | 4/1996 | Ishikawa | 235/472 |
| 5,514,859 | 5/1996 | Seigal | 235/462 |
| 5,536,928 | 7/1996 | Seigel | 235/462 |
| 5,574,272 | 11/1996 | Seo et al. | 235/454 |
| 5,576,527 | 11/1996 | Sawanobori | 235/455 |
| 5,589,678 | 12/1996 | Atsumi et al. | 235/472 |
| 5,656,803 | 8/1997 | Seo | 235/472 |
| 5,689,104 | 11/1997 | Suzuki et al. | 235/472 |
| 5,750,977 | 5/1998 | Suzuki | 235/472 |

FOREIGN PATENT DOCUMENTS

| | | |
|---|---|---|
| 7282180 | 10/1995 | Japan . |
| 7306907 | 11/1995 | Japan . |
| 8-7027 | 1/1996 | Japan . |

*Primary Examiner*—Michael G Lee
*Attorney, Agent, or Firm*—Greenblum & Bernstein, P.L.C.

[57] ABSTRACT

A symbol reading device has a casing formed with an opening which defines a symbol reading area. An image receiving element, such as a CCD, is provided within the casing. A portion of the casing, on a surface opposite to the symbol reading area, is formed with a window portion at which an optical element, which reflects light within a predetermined wavelength range, and transmits other light is provided. Accordingly, a symbol facing the opening is observable through the optical element.

21 Claims, 12 Drawing Sheets

DATA SYMBOL READER WITH OBSERVATION WINDOW

BACKGROUND OF THE INVENTION

The present invention relates to a data symbol reader used to read and decode data symbols such as two dimensional tessellated code symbols.

Recently, point-of-sale (POS) systems employ data symbol readers in order to scan bar-code labels on products, thereby increasing the speed at which products can be processed through a check out of a store. However, bar-code labels store data in only one dimension (i.e., the scanning direction) and therefore can only store a limited amount of data.

To overcome the problem of limited data storage, a new type of symbol which stores data in two directions has been proposed. This new type of symbol (hereinafter referred to as a two-dimensional symbol) uses a tessellated pattern to store the data.

When one dimensional bar-codes are used, the angle between a reference surface of the bar code and the data symbol reader is not critical, since a relatively simple scanning process is employed. Similarly, the distance between the reference surface of the bar-code and a light receiving portion of the data symbol reader is also not critical, since the simple scanning process is used.

However, if this simple scanning method is used to read two dimensional tessellated codes, the received image may be distorted and the wrong information may be decoded. Therefore, the positioning of the data symbol reader is critical if the proper information is to be decoded. Further the distance from the tessellated code to the light receiving portion of the encoded system must be kept constant in order to properly decode the tessellated code.

Thus, if this scanning system is to be used to scan a two-dimensional symbol, the positioning of the data symbol reader with respect to the reference plane of the symbol must be constant. This may prove difficult if the two-dimensional symbol is not placed on a perfectly flat surface.

In order to overcome this problem, an area sensor has been developed for the data symbol reader in order to read the two-dimensional symbols. The area sensor scans the entire tessellated pattern simultaneously. An example of a known data symbol reader employing an area sensor is shown in FIG. 11.

FIG. 11 shows a conventional data symbol reader 100 which consists of a main body 101 and a reading head 103. The reading head 103 houses a reading module 102. FIG. 12 shows a top view of an opening 104 formed in the reading head 103. The opening 104 is delimited by an rectangular wall 105 of the reading head 103. A reading area 36 is defined within the opening 104 and corresponds to an area in which the data symbol reader may be read.

As shown in FIG. 12, if a part of the data symbol 38 is overlapped with the rectangular wall 105, but inside an outer peripheral surface 106 of the reading head 103, proper decoding of the symbol 38 will not be possible.

SUMMARY OF THE INVENTION

It is therefore an object of the present invention to provide an data symbol reader which makes it possible to position the data symbol reader relative to the data symbol quickly and accurately.

For the object, according to the invention, there is provided a symbol reading device, comprising: a casing, at least a part of a surface of the casing being formed with an opening defining a symbol reading area; an image receiving element, the image receiving element receiving an image and output an image signal corresponding to a received image; and an optical system, image of a symbol to be read being formed on a image receiving surface of the image receiving element through the optical system when the symbol is located in the symbol reading area, a portion of the casing, on a surface opposite to the surface formed with the opening, being formed with a window portion through which a symbol located at the symbol reading area is observable, the optical system including an optical element provided at the window portion, the optical element deflecting light having a wavelength within a first wavelength range, and allows light having a wavelength at least within a second wavelength range which is out of the first wavelength range to pass through, the deflected light being directed to the image receiving element.

Optionally, the symbol reading device may include a light source which emits light having a wavelength within the first predetermined wavelength range towards the symbol reading area.

Preferably, the first wavelength range includes a wavelength of infrared light.

Further optionally, the symbol reading device further includes another light source which emits light having a wavelength within a visible wavelength range.

Preferably, the second wavelength range includes the wavelength of light emitted by the another light source.

Still optionally, the symbol is an encoded data symbol representative of data, and wherein the symbol reading device further comprises a decoding system which obtains data represented by the data symbol by decoding the image of the data symbol.

Further, the optical element may have a diffraction grating.

Alternatively, the optical element may have a holographic lens.

Further alternatively, the optical element may be formed with a plurality of inclined surfaces for reflecting light from the data symbol to a predetermined direction, and wherein the converging optical system further includes a converging lens which receives light reflected by the optical element and converges the received light onto the image receiving element.

Optionally, in this case, the plurality of inclined surfaces may incline by a predetermined angle with respect to the symbol reading surface.

Further, the plurality of inclined surface are arranged in a longitudinal direction of the casing, and extending in a direction perpendicular to the longitudinal direction.

Optionally, the surfaces of the optical element through which the light pass are flat and parallel to each other.

Further, the surfaces of the optical element are parallel to a surface of the symbol when the symbol is located within the symbol reading area to be read.

Further optionally, the symbol reading device may include a sensor which detects brightness of the symbol reading area, and a controller which turns on the another light source when the brightness is less than a predetermined threshold value.

Alternatively, the symbol reading device may include a manually operable switch for turning on or off the another light source.

Yet optionally, the symbol reading device may include a filter which only allows light having a wavelength within the first predetermined wavelength range to pass through, the filer being inserted within an optical path between the optical element and the image receiving element.

Further, the data symbol could be a two-dimensional tessellated symbol.

Furthermore, a surface of the symbol, the image receiving surface and the converging optical system are arranged such that the Scheimpflug rule is satisfied when the symbol reading device is positioned on the symbol.

Preferably, the symbol reading device may be provided with an image processing system which compensate distortion of the image, due to arrangement of the surface of the symbol, the image receiving surface and the converging optical system, formed on the image receiving surface.

DESCRIPTION OF THE ACCOMPANYING DRAWINGS

DESCRIPTION OF THE EMBODIMENTS

Figure 1:
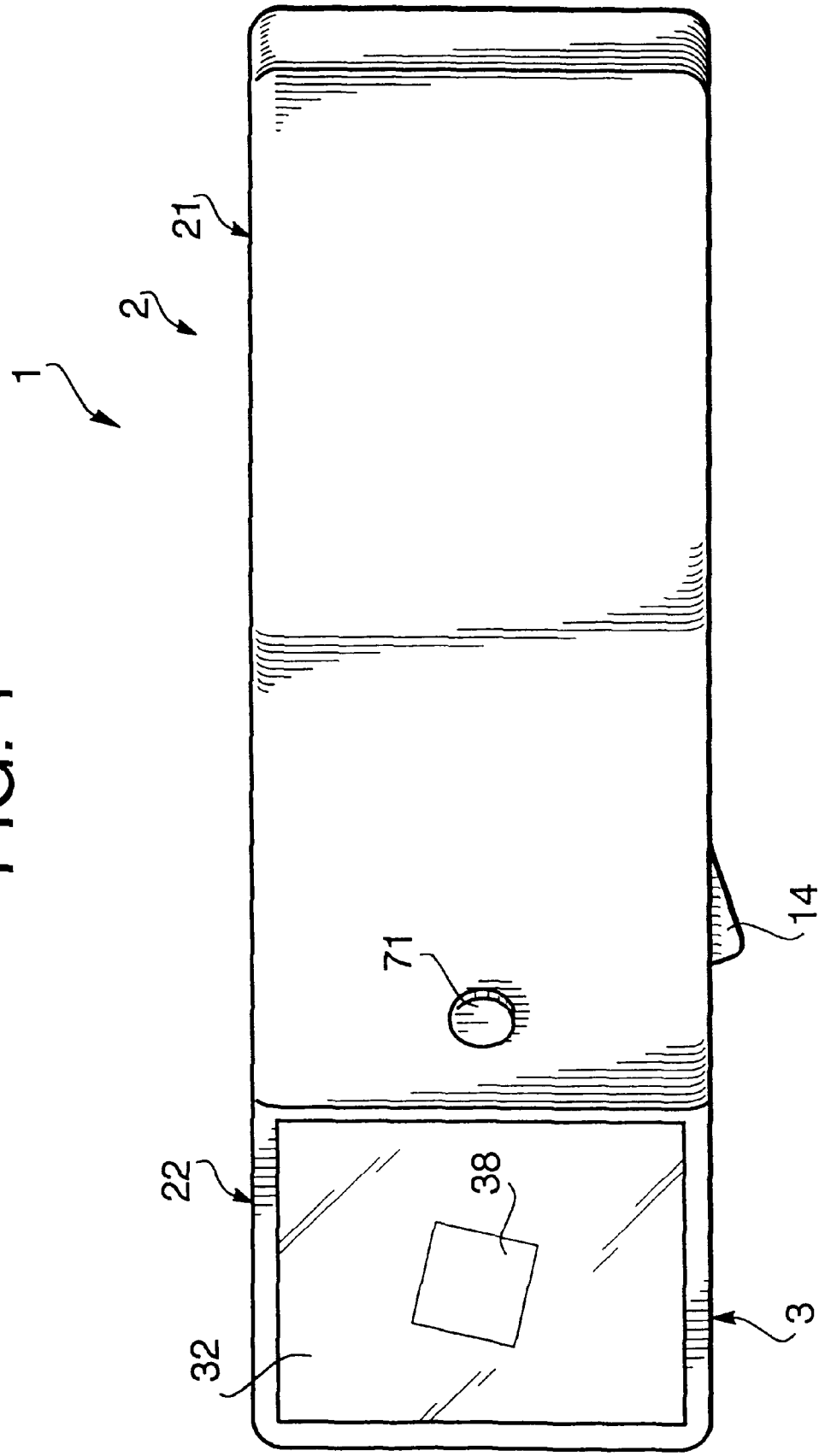
FIG. 1 shows a top view of a data symbol reader according to a first embodiment of the present invention.
Figure 2:
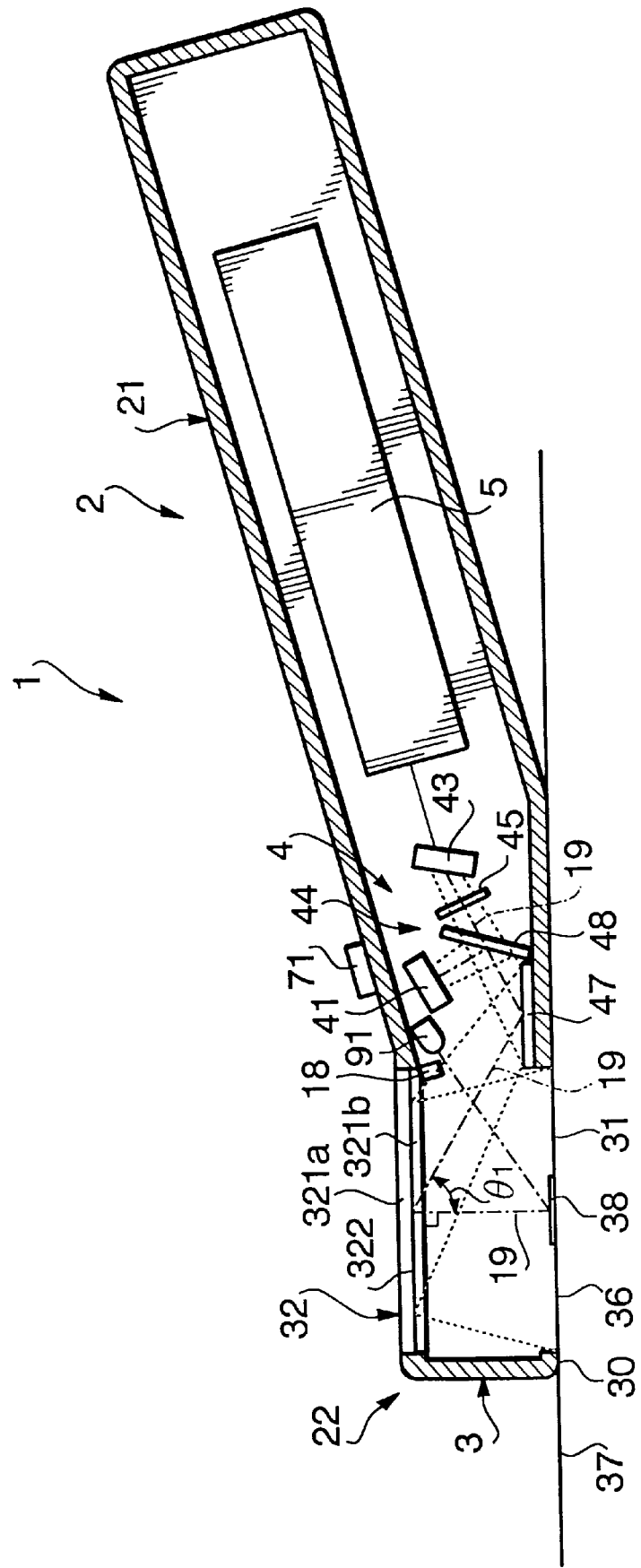
FIG. 2 is a sectional side view of the data symbol reading device shown in FIG. 1.
Figure 3:
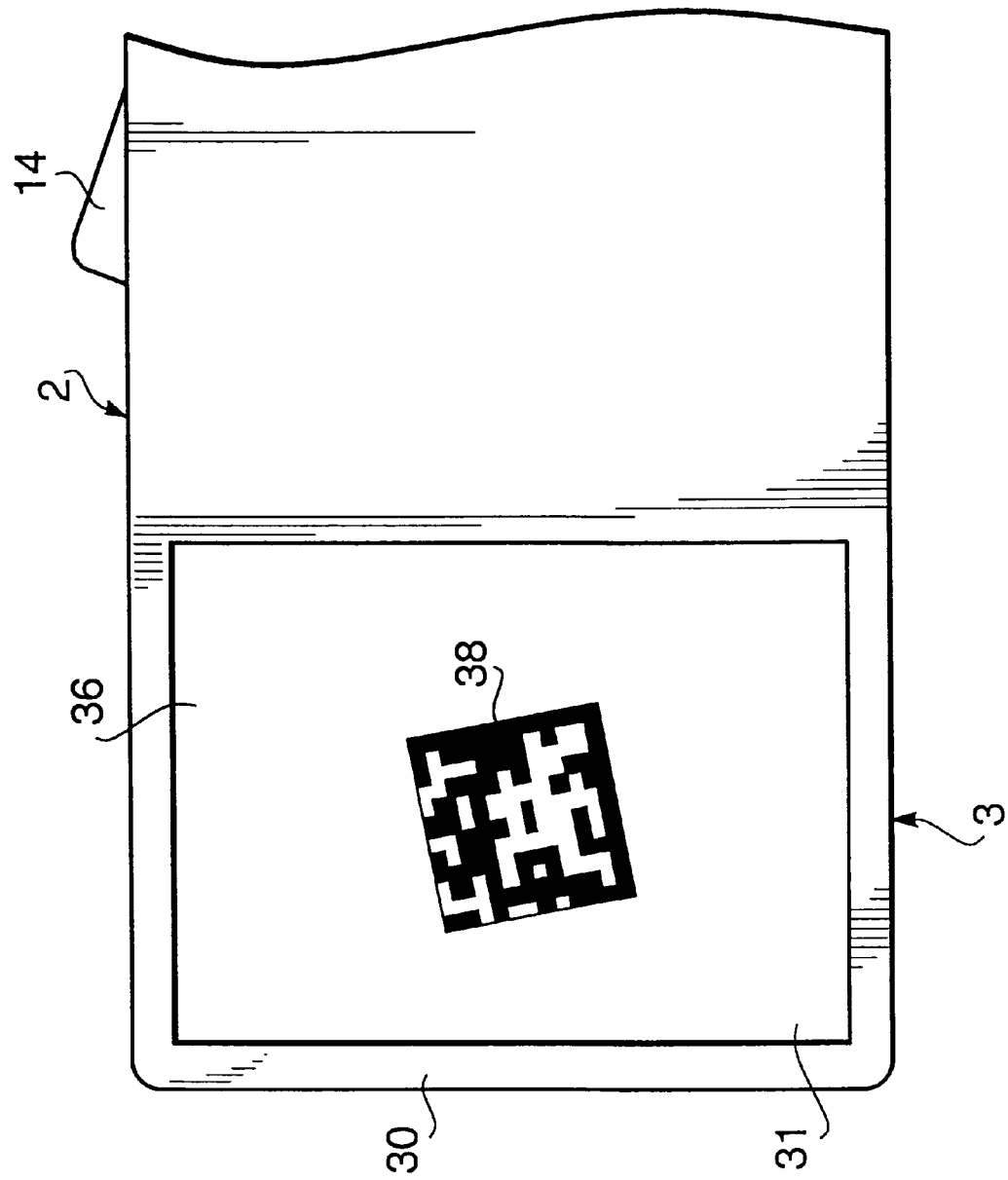
FIG. 3 is a bottom view of the housing of the data symbol reading device shown in FIG. 1.

FIG. 1 shows a top view of a data symbol reader 1 according to a first embodiment of the present invention. FIG. 2 is a sectional side view of the data symbol reader 1 shown in FIG. 1, FIG. 3 is a bottom view of the housing of the data symbol reader 1 shown in FIG. 1, and FIG. 4 is a block diagram of the circuit arrangement of the data symbol reading device shown in FIG. 1.

As shown in FIGS. 1 and 2, the data symbol reader 1 has a casing 2 including a grip part 21 and a head part 22. The casing 2 is slightly bent at a boarder between the grip part 21 and the head part 22 as shown in FIG. 2.

Figure 4:
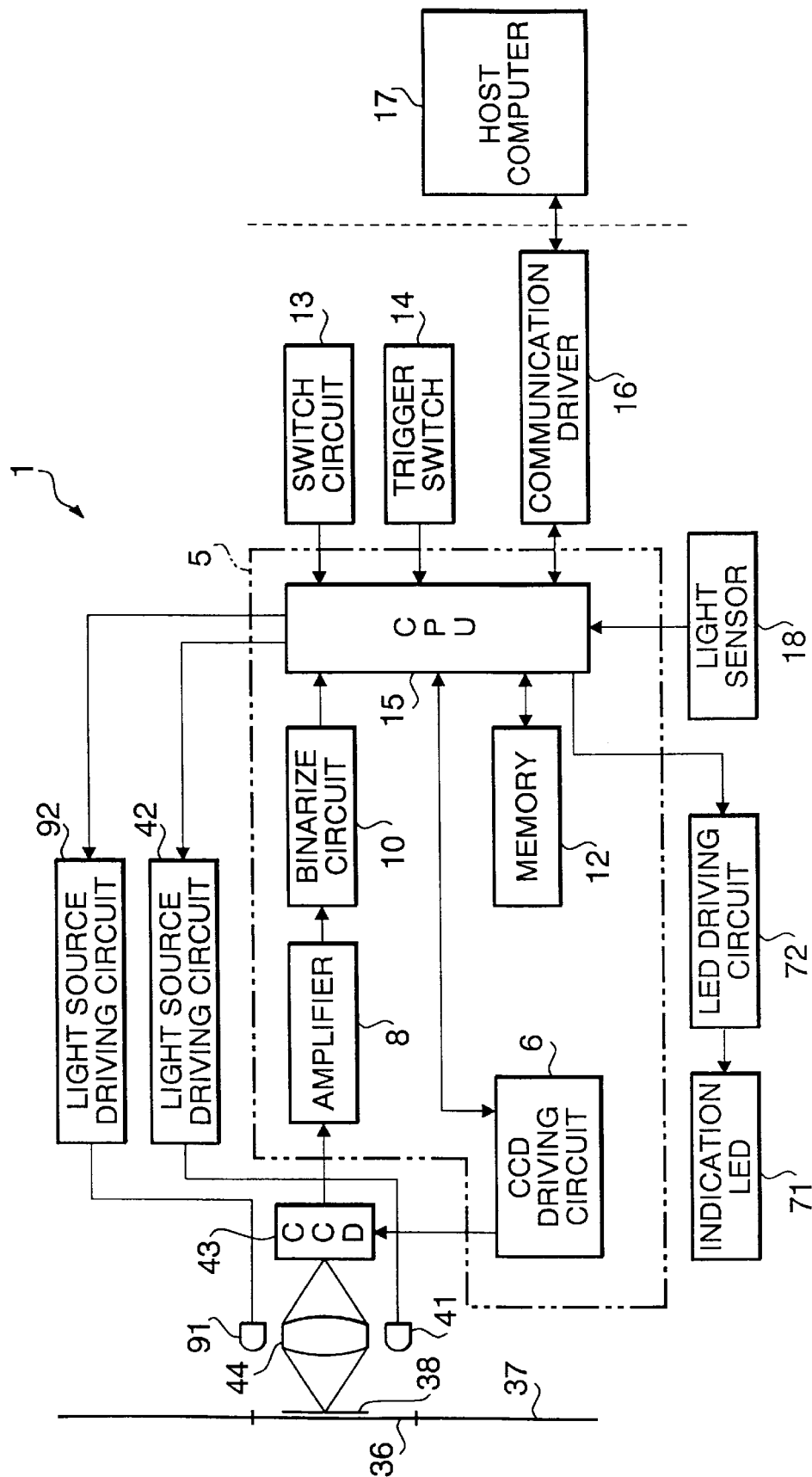
FIG. 4 is a block diagram of the data symbol reading device shown in FIG. 1.

The casing 2 houses a reading unit 4, a signal processing circuit 5, a first light source driving circuit 42, a second light source 91, a second light source driving circuit 92, a light sensor 18, and a communication driver 16 (see FIG. 4).

The light sensor 18 includes, for example, a photodiode sensible to a visible light. The light sensor 18 is provided adjacent to the second light source 91. With the light sensor 18, brightness of the symbol reading area is measured. A controller 15, which will be described later, receives output of the light sensor 18 and controls the second light source drive circuit 92 to turn ON the light source 91.

On one side of the casing 2, a trigger switch 14 is provided, and on the upper surface of the casing 2, an LED (Light Emitting Diode) 71 for indication is provided. The trigger switch 14 is a two-step switch: when it is depressed halfway, brightness measurement with use of the light sensor 18 is executed; and when it is fully depressed, reading operation is initiated.

The reading unit 4 includes a light source 41, a CCD (Charge Coupled Device) 43, an optical system 44, and supporting members (not shown) for supporting the above elements inside the casing 2. The light source 41 is used for illuminating the symbol reading area 36, within which the data symbol to be read is to be located. The optical system 44 receives light reflected by a data symbol located within the symbol reading area 36, and forms an image thereof on the light receiving surface of the CCD 43.

The optical system 44 includes a mirror 47, a half mirror 48, a filter 45, and an optical element 32 which will be described later. The filter 45 allows light having wavelength within a predetermined wavelength range which corresponds to the wavelength range of the light emitted by the light source 41. The light source 41 emits, for example, an infrared light.

The light sources 41 and 91 are located at an upper part inside the grip part 21, at the portion adjacent to the head part 22.

The light source 91 is, for example, an LED which emits a visible light including light having a wavelength out of the wavelength range of the light emitted by the light source 41.

On the light emitting sides of the light sources 41 and 91, light diffusion plates for diffusing light may be placed, respectively, so that the symbol reading area 36 is illuminated evenly.

The light sources 41 and 91 are connected to driving circuits 42 and 92, respectively. The light sources 41 and 91 are turned ON or OFF by the driving circuits 42 and 92, respectively.

The CCD 43 receives an image of a symbol located within the symbol reading area 36, and outputs image signal corresponding to the received image. Note that the light receiving surface of the attitude of the CCD 43 is tilted by a predetermined angle with respect to the optical axis 19 of the optical system 44 (i.e., the optical axis of the optical element 32) according to the Scheimpflug rule so that an image of any portion within the symbol reading area 36 is in-focus state. It should be noted that application of the Scheimpfulg's rule is well known, and an example of the application is disclosed in U.S. Pat. No. 5,032,022.

The symbol reading area 36 is an area defined on a plane 37 on which an encoded data symbol 38 is placed. The CCD 43 receives light reflected by a data symbol 38 located in the symbol reading area 36. The symbol reading area 36 substantially coincides with an opening 31 (which will be described later) of the head part 22.

As shown in FIG. 3, the data symbol 38 consists of a tessellated pattern of black and white cells (alternatively, black and transparent cells) which are arranged in a matrix. The matrix has no less than 2 columns (i.e., x columns, where X>1) and rows (i.e., y rows, where y>1) of cells. In this way, each cell can express 0 or 1 in a binary system and information can be specified by a combination of these cells. It should be noted that the data symbol 38 readable by the data symbol reader 1 is not restricted to the arrangement illustrated in FIG. 3.

As shown in FIGS. 1 and 2, the head part 22 of the casing 2 has a body 3 at the tip thereof.

A cross section of the body 3 along a plane parallel to the reading plane 37 looks U-shaped, opened towards the grip part 21.

A wall portion of the body 3 faces a reading surface 37 when the tip of the body 3 contacts the reading surface 37. The wall shown on a surface opposite to the opening facing to the reading surface 37 is formed to be a window portion, and is provided with the optical element 32. The optical element 32 is arranged parallel to the reading surface 37.

The optical element 32 is a transparent or semitransparent member allowing light having a wavelength which is out of a predetermined wavelength range to pass therethrough, and further reflects the light having a wavelength which is within the predetermined wavelength range and is transmitted from the data symbol 38 to proceeds towards the mirror 47 of the optical system 44. The optical element 32 is plate-shaped, and has flat surfaces which are parallel to each other. The upper wall made from the optical element 32 is used as an window for viewing the data symbol located within the symbol reading area 36 from the outside as mentioned before.

The optical element 32 has a pair of transparent (or semitransparent) base plates: a first base plate 321a shown on the upper side in FIG. 2; and a second base plate 321b shown on the lower side in FIG. 2. Between the first base plate 321a and the second base plate 321b, a plurality of layers of optical thin films are formed (not shown in FIG. 2).

On the inner surface (lower side surface in FIG. 2) of the first base plate 321a, diffraction gratings having predetermined characteristics is formed. The optical element 32 is a hologram lens (diffraction grating lens). The inner surface of the base plate 321a will be referred to as a grating surface 322.

The grating surface 322 converges light passed therethrough, and further deflecting the light incident thereto.

The plurality of layers of the optical thin films are arranged such that the light having wavelength with in the wavelength range (e.g., approximately 700–760 nm) of the reading light, i.e., infrared light, is reflected by the optical thin films.

The optical element 32, i.e., the grating surface 322 has characteristics as indicated below.

(1) Under a situation where the optical device 32 is parallel to the reading surface 37, the grating surface 322 reflects, and converges the light, which is reflected by a symbol located at the symbol reading area 36 and incident on the optical element 32, towards the CCD 43 and forms an image of the data symbol 38 on the light receiving surface of the CCD 43. Note that the multi-layered thin films function as a light reflection member.

(2) The optical axis 19 of the optical element 32 is deflected by an angle θ1. That is, light incident to the optical element 32 normal thereto is reflected by the optical element 32 to proceed along an axis which is inclined with respect to the incident light by the angle of θ1. The angle θ1 is, preferably, within 50–70 degrees.

It should be noted that the angle θ1 depends on the direction of the optical axis of the optical system 44 accommodated in the grip part 21. In other words, the optical system 44 and the CCD 43 are arranged such that the light reflected by the optical element is directed to the CCD 43.

The body 3 functions as a guide or spacer for keeping the reading unit 4 apart from the symbol reading area 36 by a predetermined distance. That is, a positional relationship between the data symbol 38, and the optical system 44 and the CCD 43 is defined by the body 3. When the body 3 is correctly located on a plane having the data symbol 38, i.e., when the data symbol 38 is located within the symbol reading area 36, the in-focus image of the symbol is formed on the light receiving surface of the CCD 43.

The body 3 is formed with a square opening 31. In this embodiment, as shown in FIG. 3, the end surface 30 of the body 3 functions as an indication mark which indicates the edge of the symbol reading area 36.

In order to read a data symbol 38, an operator grips the grip part 21, and abuts the end surface 30 of the body 3 against the reading surface 37, and adjusts the position of the symbol reading area 36 relative to the symbol 38 to be read.

The operator adjusts the position of the symbol reading area 36 with viewing the symbol 38 through the optical element 32 (i.e., the window portion) such that the data symbol 38 is located within the data symbol area 36, or inside the opening 31.

When the data symbol 38 is located within the symbol reading area 36, the operator depresses the trigger switch 14, then, as mentioned before, the reading operation is initiated.

when the reading operation starts, the light source driving circuit 42 turns on the light source 41. A part of the light (infrared light) emitted by the light source 41 is reflected by the half mirror 48, and further reflected by the mirror 47, and then reflected on the grating surface 322 of the optical element 32 such that the optical axis of the reflected light is normal to the reading surface 37, thereby the symbol reading area 36 being illuminated.

The light reflected by the symbol 38 within the symbol reading area 36 is reflected by the multi-layered optical thin films formed on the grating surface 322, and is incident on the mirror 47. The light further reflected by the mirror 47, and then a part of the reflected light passes through the half mirror 48. The reflected light passed through the half mirror 48 passes through the filter 45, and converged on the light receiving surface of the CCD 43. The CCD 43 outputs the image signal corresponding to the received light, i.e., image of the data symbol 38.

Since the upper and lower surfaces of the optical element 32 in FIG. 2 are parallel to each other, the optical element 32 functions as a transparent parallel plate for an ambient light, and light reflected from the symbol reading area 36 and having component of visible light. Accordingly, the operator can visibly recognizes the position of the symbol 38 within the symbol reading area 36.

When the light source 91 is turned on, the visible light emitted by the light source 91 is reflected at the symbol reading area 36. The reflected visible light is passes through the optical element 32. Therefore, even if the symbol reading device is operated in a dark place, the operator can easily view the data symbol 38 through the optical element 32.

As shown in FIG. 2, inside the casing 2, the signal processing circuit 5 is provided. The circuit 5 may be provided on a printed circuit board.

FIG. 4 is a block diagram of the symbol reader 1 described above.

The signal processing circuit 5 has a CCD driving circuit 6, an amplifier 8, a binarizing circuit 10, a memory 12, a controller 15 which are electrically connected with each other.

The controller 15 is also connected with the light source driving circuits 42 and 92, the LED driving circuit 72, the light sensor 18, the communication driver 16, the trigger switch 14, and switch circuit 13 including power switch (not shown) and the like. A display device such as an LCD (liquid crystal display) or a CRT (cathode ray tube) display may be connected to the controller 15.

As described before, when the trigger switch 14 is depressed, the reading operation is initiated. The image signal output by the CCD 43 is processed by the signal processing circuit 5. The processed signal output by the signal processing circuit 5 is decoded, and then transmitted to a host computer 17 such as a personal computer or a word station through the communication driver 16. The host computer 17 performs necessary operation based on the transmitted data.

The light source driving circuits 42 and 92 are for supplying electricity to light sources 41 and 92, respectively. The light source driving circuits 42 and 92 are controlled by the controller 15, respectively.

As mentioned before, the trigger switch 14 is the two-step switch. When the trigger switch 14 is depressed halfway, brightness detection operation is performed with use of the light sensor 18, which will be described in detail later. The controller 15 controls the light source 91 based on a detected brightness value (An).

When the trigger switch 14 is fully depressed, the controller 15 controls the light source driving circuit 42 to turn on the light source 41. The controller 15 controls the light source driving circuit 42 to turn OFF the light source 41 after a decoding operation has finished, or a decoding error has detected.

Further, when the trigger switch 14 is fully depressed, the controller 15 drives the CCD driving circuit 6. The CCD driving circuit 6 outputs CCD horizontal driving pulses, and CCD vertical driving pulses. Charges are accumulated in the CCD 43, and the transferred in accordance with the CCD horizontal driving pulses and CCD vertical driving pulses.

Further, the CCD driving circuit 6 generates a clock signal. The clock signal is combined with a horizontal synchronizing signal, and then transferred to the controller 15 as a combined clock signal.

The image signal output by the CCD 43 is amplified by an amplifier 8, and then converted into a digital signal by means of an A/D (analog-to-digital) converter (not shown), and transferred to the binarizing circuit 10.

The binarizing circuit compares the received digital data with a reference data, and outputs a logical H (high) or logical L (low).

Thus binarized data is stored in the memory 12 at an address designated by an address counter incorporated in the controller 15. The address counter operates synchronously with the combined clock signal transmitted from the CCD driving circuit 6.

From the memory 12, the stored data is read in accordance with the address designated by the address counter. It should be noted that reading order of the data may be opposite to the storing order of the data.

At an calculation unit of the controller 15, for an image corresponding to one frame, various image processing such as a reversing operation, symbol area extraction or edge detection, compensation for a trapezoidal distortion, rotation are executed. Further, the controller 15 decodes the extracted image of the data symbol 38 with use of a decoder incorporated therein so that data corresponding to the code system of the data symbol is obtained.

The decoded data is transferred to the host computer 17 through the communication driver 16.

Control of the controller 15 will be illustrated with reference to a flowchart shown in FIG. 5.

The controller 15 determines whether the trigger switch 14 is depressed halfway at S201. If the trigger switch 14 has been depressed halfway (S201:YES), the controller 15 detects the brightness of the symbol reading area 36 with use of the light sensor 18 (S203). Specifically, the controller 15 obtains the detected brightness value (An) representative of amount of light received by the light sensor 18, wherein n is a natural number (1, 2, 3, . . . ).

In S204, the controller 15 compares the detected brightness value (An) with a predetermined threshold value (B). The threshold value is initially set to a value greater than the lower limit value (Bmin), where the lower limit value (Bmin) corresponds the lowest brightness necessary for an operator to view the data symbol 38 through the optical element 32.

If the detected brightness value (An) is equal to or less than the threshold value (S204:YES), then the controller 15 controls the light source driving circuit 92 to turn ON the light source 91 so that the symbol reading area 36 is illuminated with a visible light (S205).

At S206, the controller 15 determines whether the trigger switch 14 is fully depressed. If the trigger switch 14 is not fully depressed, control returns to S201, and process described above is repeated.

If the trigger switch 14 is fully depressed (S206:YES), the controller 15 controls the driving circuit 92 to turn OFF the light source 91 (S207). Then, the controller 15 calls a sub routine "symbol reading process" in order to execute the symbol reading operation (S208), which will be described below.

In S201, if the trigger switch 14 is not depressed (S201:NO), the light source 91 is turned OFF.

In S204, if the detected brightness value (An) is greater than the threshold value (S204:NO), the light source 91 is not turned ON at this stage, and control goes to step S206.

Figure 5:
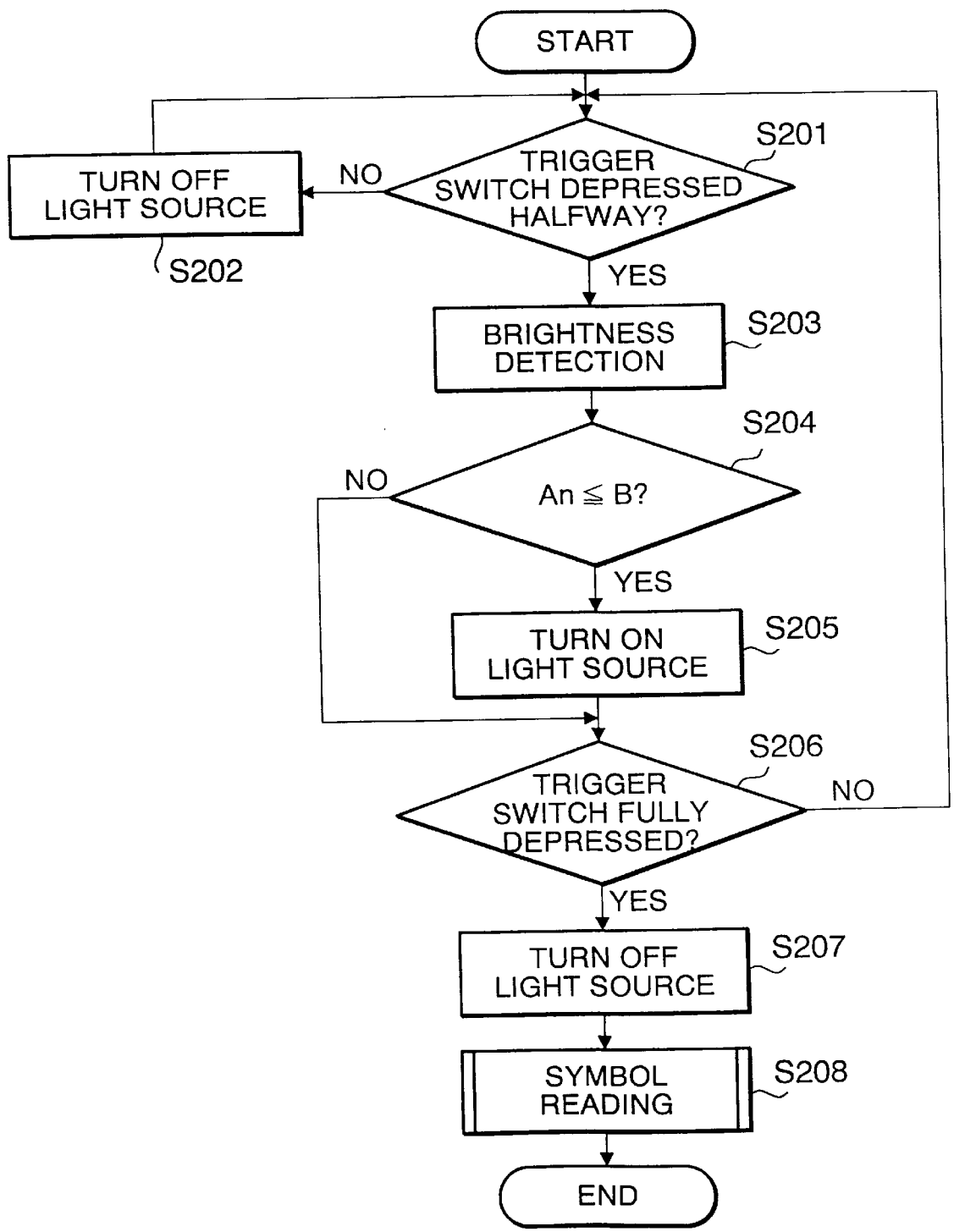
FIG. 5 is a flowchart illustrating a main process executed by the symbol reader.
Figure 6:
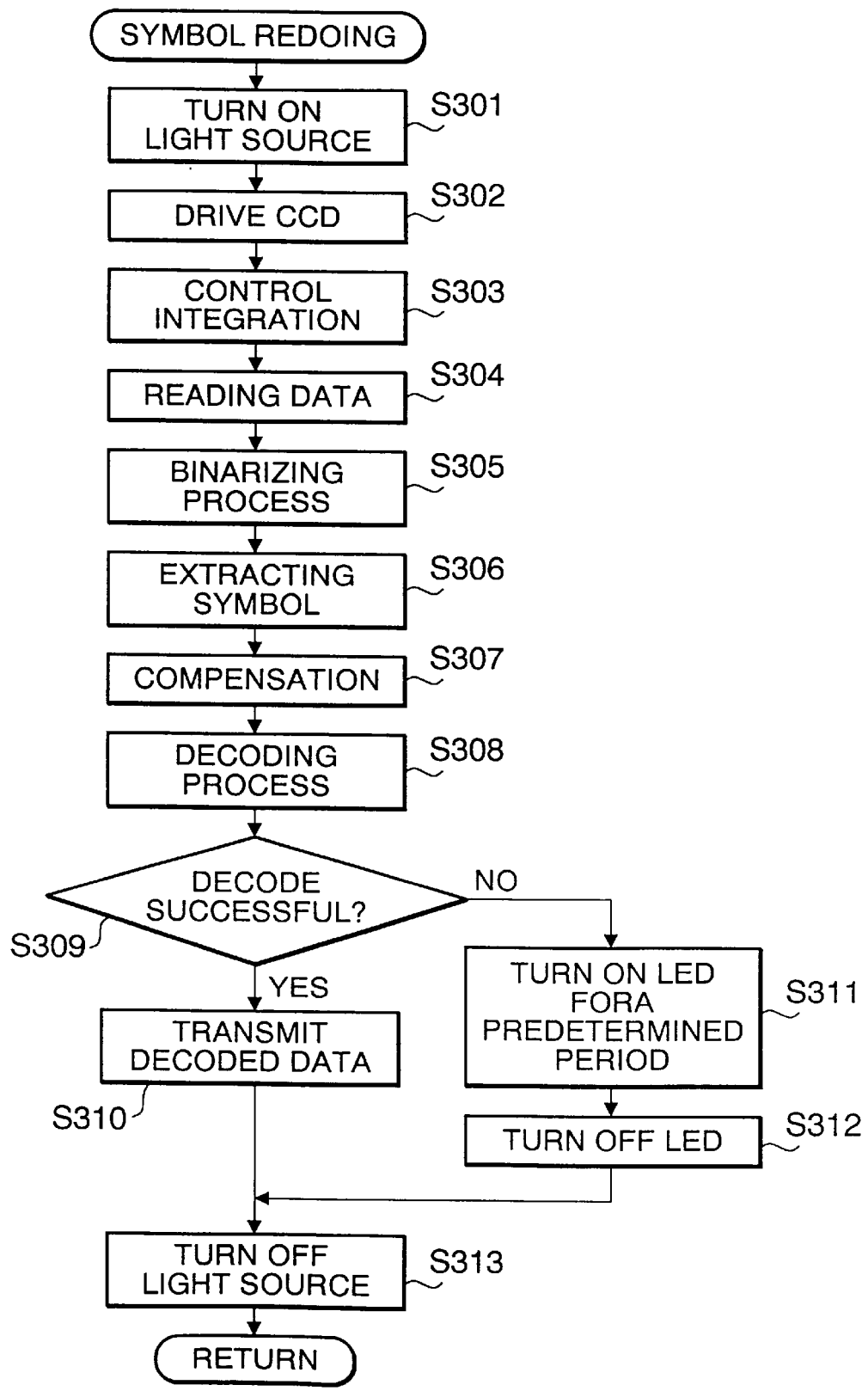
FIG. 6 is a flowchart illustrating a symbol reading process.

FIG. 6 shows a flowchart illustrating the subroutine, "symbol reading process", which is called at step S208 of the process shown in FIG. 5.

In the symbol reading process, the controller 15 controls the light source driving circuit 42 to turn ON the light source 41 to emit the infrared light to the symbol reading area 36 (S301).

At S302, the controller 15 controls the CCD drive circuit 6 to start driving the CCD 43. An integration period is controlled at S303, and then electric charges accumulated are read to obtain the image signal (S304). The controller 15 transmits the obtained image signal to the binarizing circuit 10 through the amplifier 8 to binarize the image signal (S305). The binarized image signal is stored in the memory 12.

The controller 15 then extracts the symbol area based on the image data stored in the memory 12 (S306). Note that the light receiving surface of the CCD 43 is inclined with respect to the optical axis of the optical system 44 in order to obtain the in-focus image. Accordingly, the image formed on the light receiving surface of the CCD 43 has the trapezoidal distortion. For example, if the data symbol is square, the image formed on the CCD 43 is a trapezoidal shape. In such a case, the shape extracted at S306 is also trapezoidal.

Figure 13:
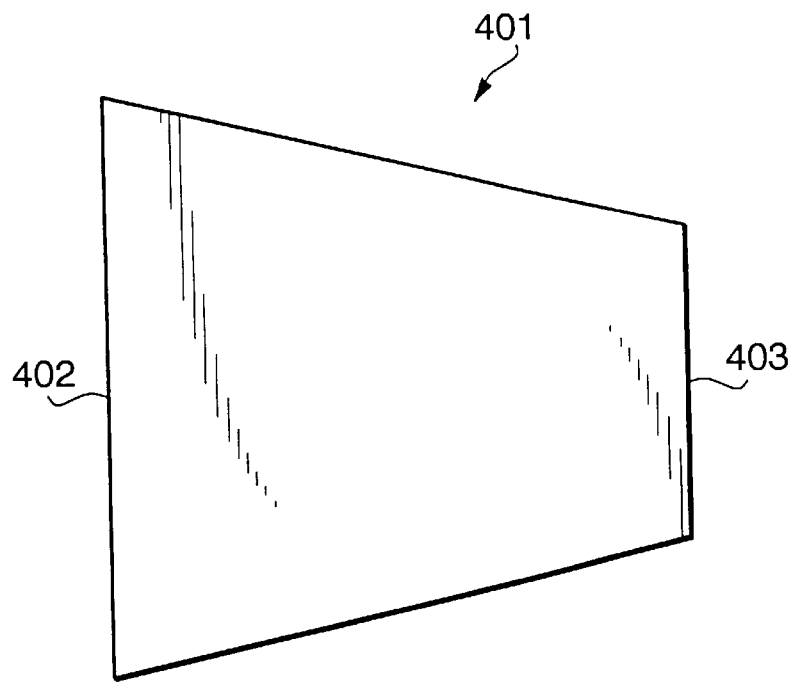
FIG. 13 shows a shape of the data symbol extracted from the image data.

In S307, compensation process for compensating the trapezoidal distortion is executed. In this step, the shape of the extracted data symbol is detected. Specifically, as shown in FIG. 13, a longer side 402 and a shorter side 403 of the trapezoid 401 is detected. Then, interpolation operation is executed such that pixels are interpolated to expand the shorter area to have the same length of the longer side 402. For example, interpolation of pixels in the direction parallel to the longer side 402 is executed, and the interpolation operation is performed for the trapezoid 401 from longer side 402 to the shorter side 403.

With this operation, the trapezoid 401 is reformed to become close to the shape of the data symbol 38.

After the trapezoidal distortion is compensated, the controller 15 executed decoding operation (S308). At S308, it is examined whether the decoding is successful or not. If an appropriate decoded data is obtained, the controller 15 determines that the decoding was successful (S309:YES), and if the appropriate decoded data is not obtained, the controller 15 determined that the decoding was failed (S309:NO).

If the decoding operation was successful (S309:YES), the controller 15 transmits the decoded data to the host computer 17. If the decoding operation was not successful (S309;NO), the controller 15 controls the LED driving circuit 72 to blink the LED 17 in order to indicate an error occurs for a predetermined period (S311). Thereafter, the controller 15 turns OFF the light source 41 (S313), and return to the main process shown in FIG. 5.

As described above, the data symbol reader 1 is provided with an optical element which reflects the light emitted by the light source 41 and reflected by the data symbol 38, and which allows the light emitted by the light source 91 and reflected by the data symbol 38. Accordingly, the operator can view the position of the data symbol 38 relative to the symbol reading area 36, and position the symbol reader 1 correctly.

Accordingly, positioning of the symbol reading device relative to the data symbol to be read can be done easily and accurately, and the reading error based on the bad positioning of the symbol reader with respect to the data symbol can be prevented.

The optical element 32 functions a viewing window for an operator to view the data symbol, and a reflector which reflects the light from the data symbol to a reading optical system. Further to the above, the optical element 32 is arranged parallel to the reading surface 37, the size of the head part, height of the body 3 can be made smaller, which makes it possible to provide a compact symbol reader.

Furthermore, the optical element 32 deflects the incident light, the height of the body 3, i.e., the distance between the optical element and the symbol reading area 36 can be made shorter. Therefore, the operator can recognize the position of the data symbol through the optical element 32 from various angles. Further, with such an arrangement, loss of light can also be reduced, and ambient light may be sufficient for the operator to view the data symbol through the optical element 32.

The optical axis of the optical system 44 is normal to the reading surface 37, even if the surface on which the data symbol is formed is uneven, accurate image can be obtained and reading error may be avoidable.

Further, according to the data symbol reader 1, the ambient light does not directed to the CCD 43. The optical element 32 only reflects the infrared light. Therefore, the infrared component of the ambient light does not enter the body 3. The other components of the ambient light enter the body 3 through the optical element 32, however, such light components are not reflected by the optical element 32 inside the body 3 and pass through the optical element 32. Even if a part of such a component is reflected by the optical element 32, the filter 45 provided in front of the CCD 43 prevents the light from being incident on the CCD 43. Therefore, the ambient light does not affects the reading operation.

Still further, since the symbol reader 1 is provided with the light source 91 for emitting light for illuminating the symbol reading area 36, the operator can recognize the position of the data symbol 38 even in a dark place.

Turning ON and OFF of the light source 91 is automatically done based on the detected brightness, the operation is simplified, and life of batteries can be elongated.

Note that the light emitted by the light source 41 is not necessarily be limited to the infrared light. For example, a visible light having wavelength of 660 nm can be employed.

The optical element can be replaced with another grading optical element instead of the holographic lens.

Figure 7:
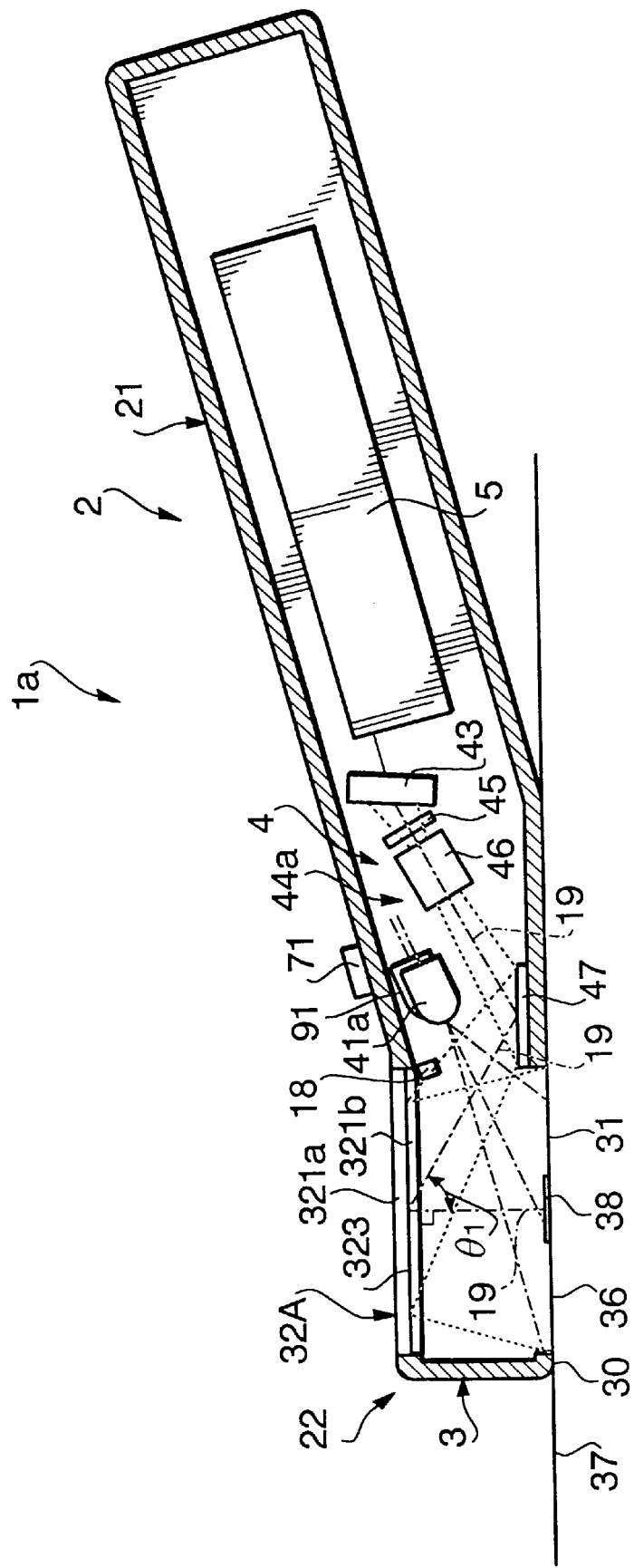
FIG. 7 is a cross-sectional side view of a data symbol reader according to a second embodiment.
Figure 8:
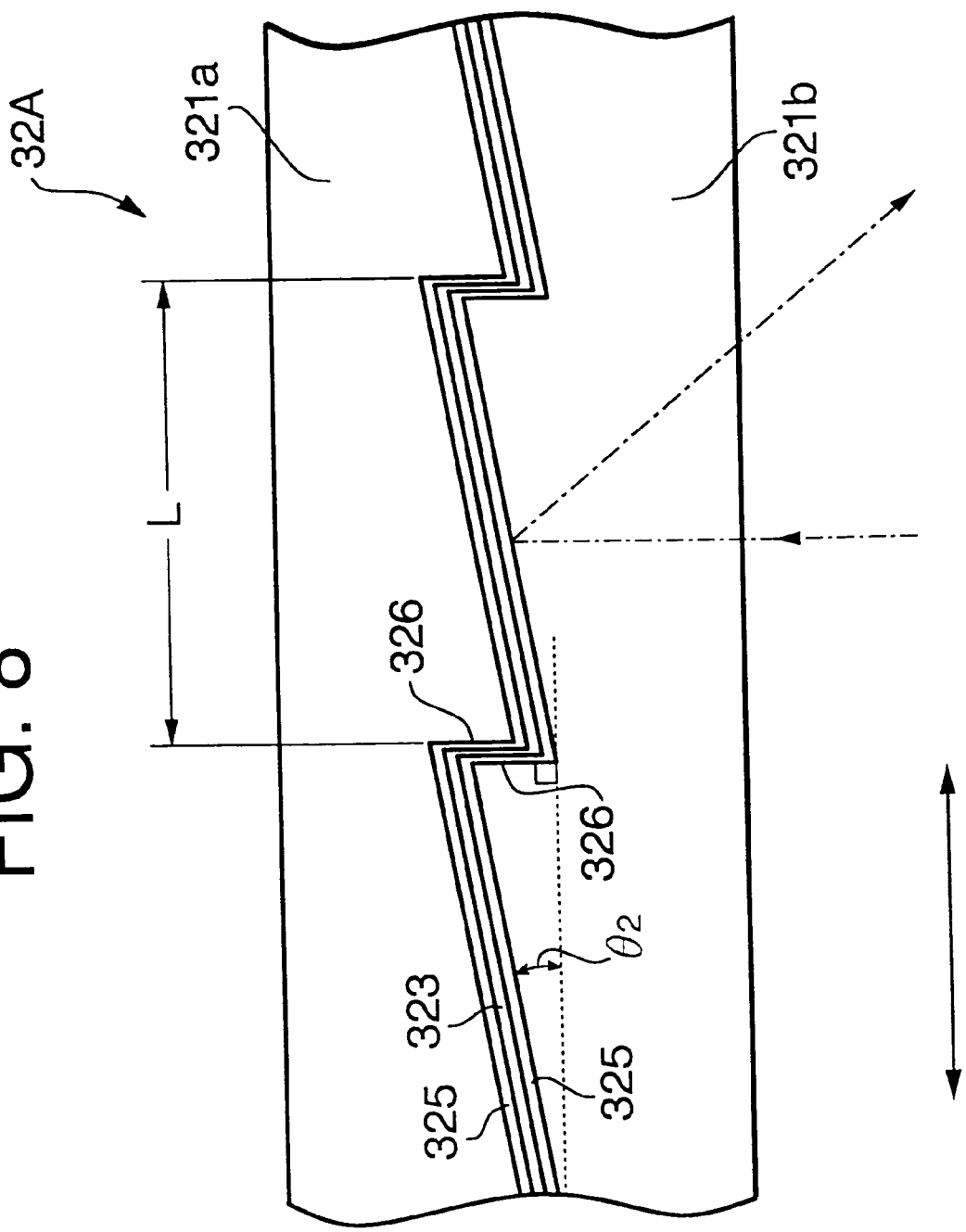
FIG. 8 is an enlarged side view of an optical device used in the data symbol reader shown in FIG. 7.
Figure 9:
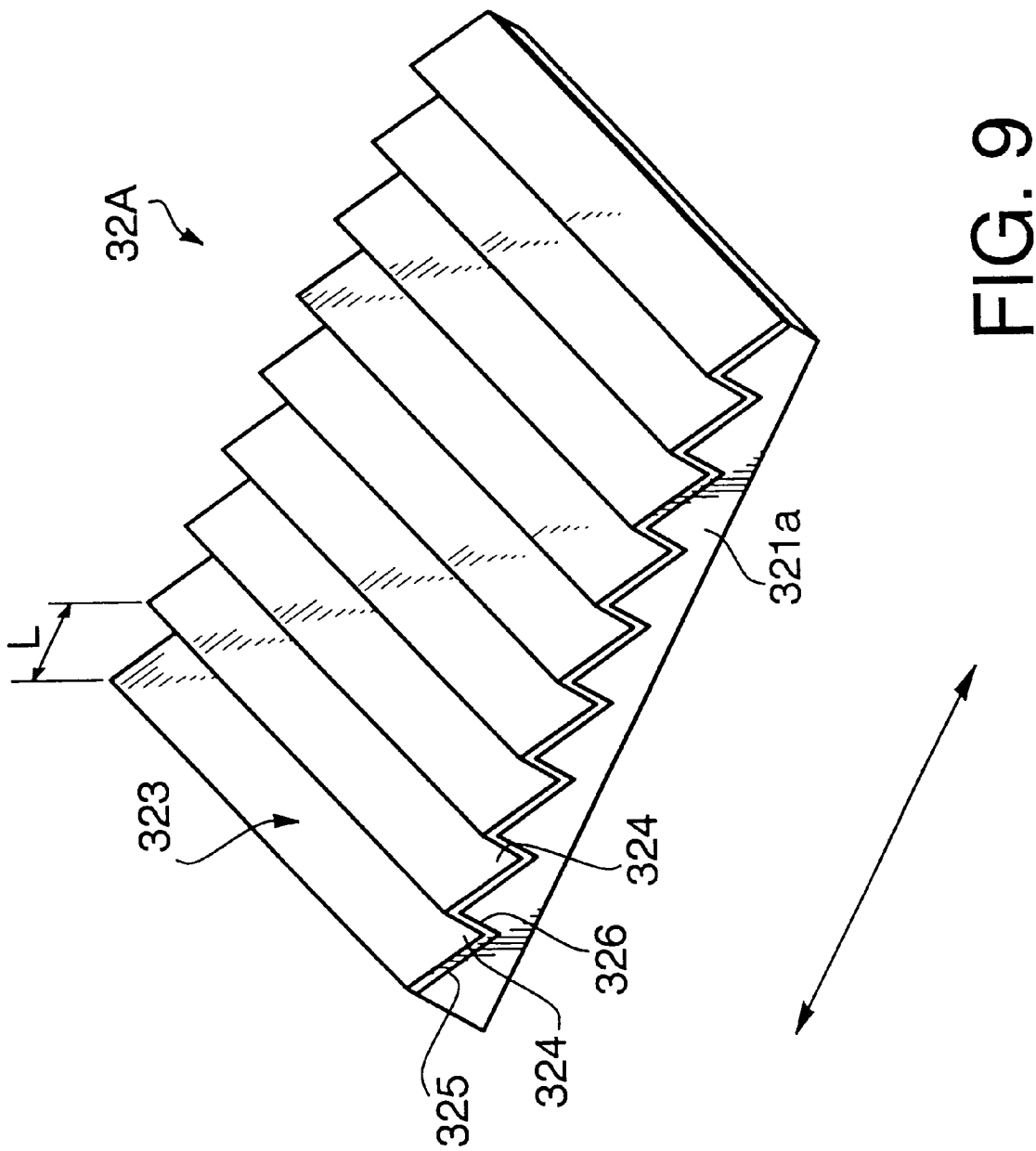
FIG. 9 is a perspective view of the optical element shown in FIG. 8.

FIG. 7 shows a sectional side view of a data symbol reader 1a according to a second embodiment of the invention, FIG. 8 is a side view of an optical element 32A, which corresponds to the optical element 32 of the first embodiment, and FIG. 9 is a schematic perspective view of the optical element 32A shown in FIG. 8.

Note that description hereinafter, the same elements as employed in the first embodiment are given the same reference numerals and description thereof will be simplified or omitted.

As shown in the drawings, in the data symbol reader 1a has the optical system 44a having the mirror 47, a converging lens 46, the light source 41, the filter 45, and an optical element 32a. The converging lens 46 converges the light reflected by the mirror 47 on the light receiving surface of the CCD 43. In this embodiment, the filter allows light having a wavelength within a predetermined wavelength range which corresponds to the wavelength range of the light emitted by the light source 41a. As shown in FIG. 7, the filter 45 is provided between the lens 46 and the CCD 43.

The light source 41a emits light having the wavelength of 660 nm. The light source 91 is similar to that in the first embodiment.

The optical element 32A is transparent or semitransparent, and further reflects light having a predetermined wavelength. Thus, a component having the predetermined wavelength of the light reflected by the data symbol is reflected by the optical element 32A and directed to the mirror 47. The optical element 32A is a plate-like element, and the upper and lower surfaces of the optical element 32A are flat surfaces parallel to each other.

The optical element 32A has first and second transparent (or semitransparent) base plates 321a and 321b, and multi-layered optical thin films 323 formed between the first and second base plates 321a and 321b.

The multi-layered optical thin films 323 has a particular structure such that only the light having a wavelength within a wavelength range of the light emitted by the light source 41a is reflected. The other light components pass through the optical thin films 323.

Note that the optical element 32a does not have a function to converge flux of light.

As shown in FIGS. 8 and 9, the first and second based plates 321a and 321b are formed with a plurality of grooves 324 having a V-shape cross section. The multi-layered thin films 323 are formed on the surface on which the plurality of grooves 324 are formed. That is, on each of the first and second base plates 321a and 321b, a plurality of inclined surfaces provided with the multi-layered thin films 323 are formed.

The plurality of grooves 324 are arranged in the longitudinal direction of the data symbol reader 1a, on a plane parallel to the reading surface 37, and each groove 324 extends in the direction perpendicular to the longitudinal direction of the data symbol reader 1a. The plurality of grooves 324 are formed next to each other.

Each groove 324 is figured such that one surface inclines with respect to the reading surface 37, by an angle of θ2, and the other surface of the groove 324 is perpendicular to the reading surface 37.

The angle θ2 is set such that the light reflected by the data symbol 38 is directed to the mirror 47. Preferably, the angle θ2 is 25–30 degrees. It should be noted that the angle θ2 depends on the arrangement of the direction of the optical axis 19 of the optical system 44 accommodated in the grip part 21. In other words, the optical system 44a and the CCD 43 is arranged such that the light reflected by the optical element 32A is directed to the CCD 43.

In the second embodiment, width L of each groove 324 is 0.1–0.2 mm. The base plates 321a and 321b have substantially the same optical characteristics, including refractive index.

The optical element 32A is formed as indicated below.

Firstly, on the surface 325 of the first base plate 321a, the multi-layered optical thin films are formed by evaporation or spattering. Then, with use of adhesive agent, the second base plate 321b is adhered such that the grooves 324 engage with each other.

Since the operation of the data symbol reader la is similar to that of the first embodiment, description thereof will be omitted.

Figure 10:
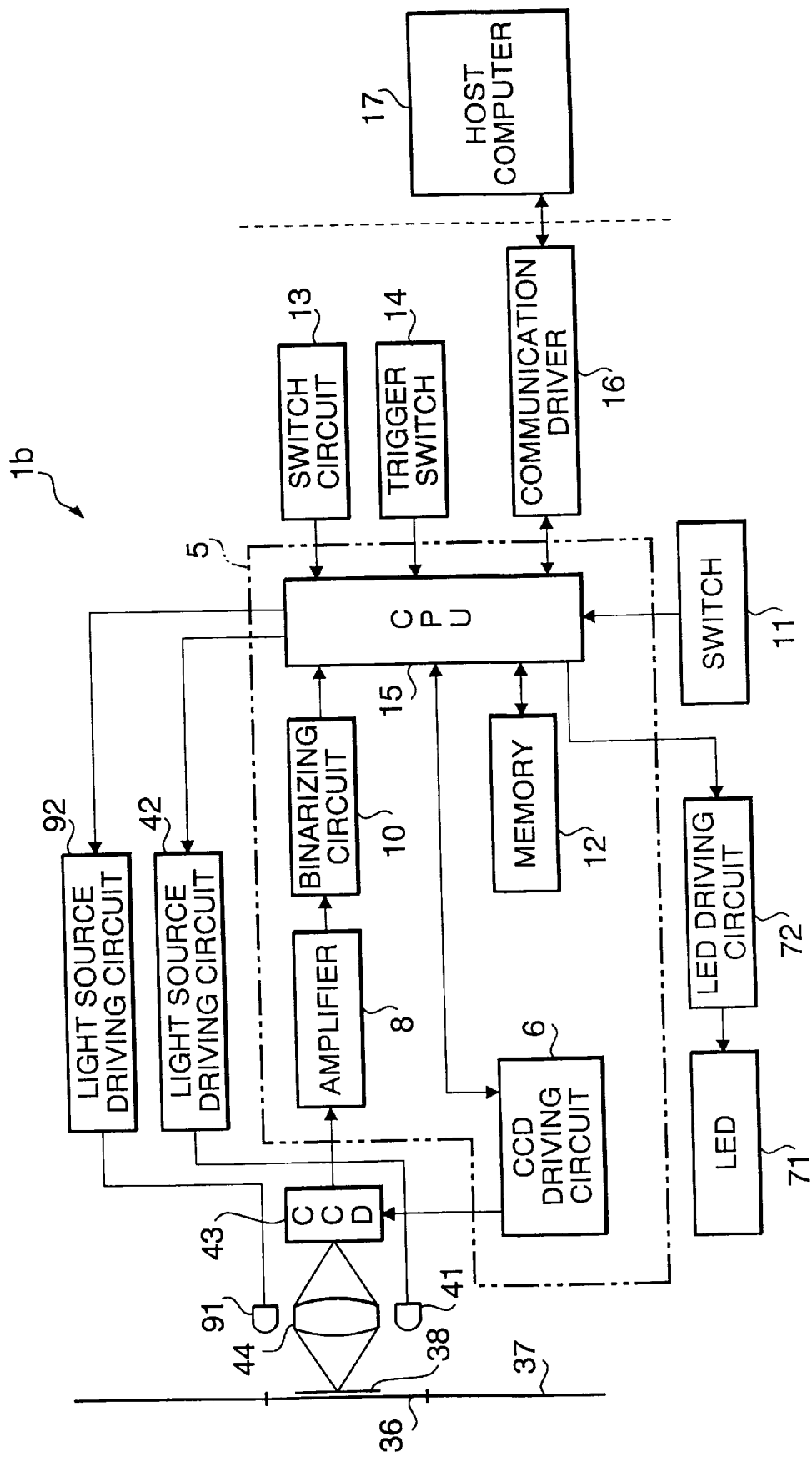
FIG. 10 is a block diagram illustrating a data symbol reader according to a third embodiment.
Figure 11:
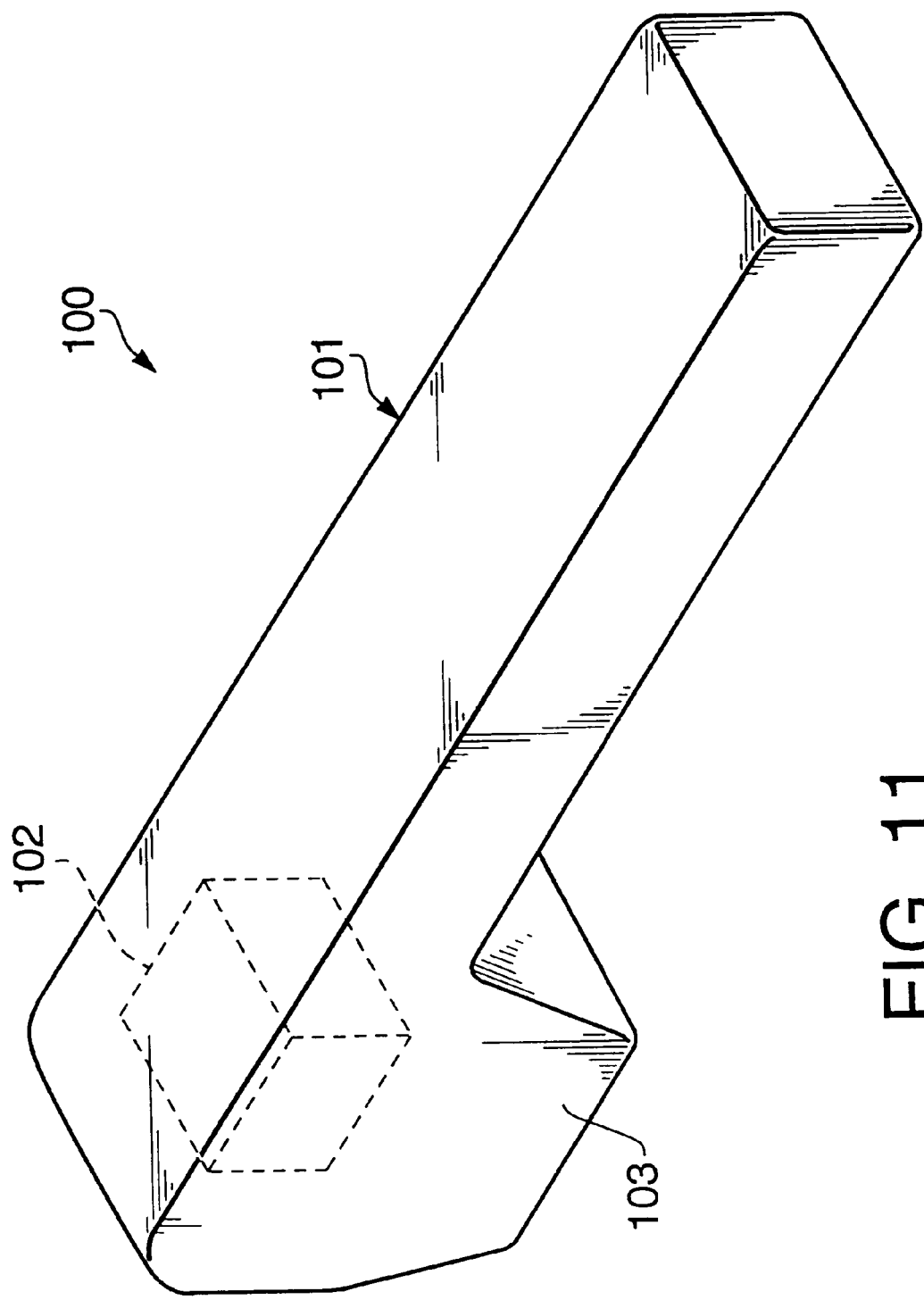
FIG. 11 is a schematic perspective view of a conventional data symbol reader.
Figure 12:
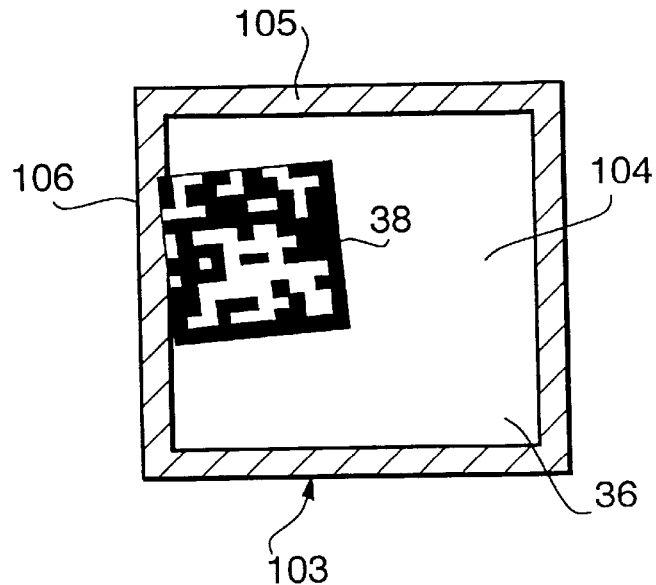
FIG. 12 shows a bottom view of the symbol reading area illustrating a problem in the conventional symbol reader.

FIG. 10 is a block diagram of a data symbol reader 1b according to a third embodiment of the invention.

The data symbol reader 1b is similar to the first embodiment except that it is provided with a manually operable light switch 11, and is not provided with the light sensor 18.

According to the third embodiment, when the operator turn ON the light switch 11, the light 91 is turned ON to illuminate the symbol reading area 36 with the visible light, and when the operator turned OFF the light switch 11, the light source 91 is turned OFF.

It should be noted, that for the third embodiment, the main process shown in FIG. 5 should be modified such that steps S202, S203, S204, S205, S206 and S207 are skipped. In other words, in the third embodiment, upon operation of the trigger switch 14, the symbol reading process shown in FIG. 6 is executed immediately.

The present disclosure relates to subject matter contained in Japanese Patent Application No. HEI 08-148230, filed on May 17, 1996, which is expressly incorporated herein by reference in its entirety.

What is claimed is:

1. A symbol reading device, comprising:
   a casing, at least a portion of said casing being formed with an opening defining a symbol reading area;
   an image receiving element, said image receiving element receiving an image outputting an image signal corresponding to a received image; and
   an optical system, an image of a symbol to be read being formed on an image receiving surface of said image receiving element through said optical system when said symbol is located in said symbol reading area,
   a portion of said casing, on a surface opposite to said surface formed with said opening, being formed with a window portion through which a symbol located at said symbol reading area is observable, said optical system including an optical element provided at said window portion, said optical element extending parallel to a surface of said symbol when said symbol is located within said symbol reading area to be read, said optical element deflecting light having a wavelength within a first wavelength range, and allowing light having a wavelength at least within a second wavelength range, which is out of said first wavelength range, to pass through said optical element, said deflected light being directed to said image receiving element.

2. The symbol reading device according to claim 1, further comprising a light source which emits light having a wavelength within said first predetermined wavelength range towards said symbol reading area.

3. The symbol reading device according to claim 2, wherein said first wavelength range includes a wavelength of infrared light.

4. The symbol reading device according to claim 3, further comprising another light source which emits light having a wavelength within a visible wavelength range.

5. The symbol reading device according to claim 4, further comprising a sensor which detects brightness of said symbol reading area, and a controller which turns on said another light source when said brightness is less than a predetermined threshold value.

6. The symbol reading device according to claim 4, further comprises a manually operable switch for turning on or off said another light source.

7. The symbol reading device according to claim 3, wherein said second wavelength range includes the wavelength of light emitted by said another light source.

8. The symbol reading device according to claim 1, wherein said symbol is an encoded data symbol representative of data, and wherein said symbol reading device further comprises a decoding system which obtains data represented by said data symbol by decoding the image of said data symbol.

9. The symbol reading device according to claim 8, wherein said data symbol comprises a two-dimensional tessellated symbol.

10. The symbol reading device according to claim 1, wherein said optical element comprises a diffraction grating.

11. The symbol reading device according to claim 1, wherein said optical element comprises a holographic lens.

12. The symbol reading device according to claim 1, wherein said optical element is formed with a plurality of inclined surfaces for reflecting light from said data symbol to a predetermined direction, and wherein said optical system further includes a converging lens which receives light reflected by said optical element and converges the received light onto said image receiving element.

13. The symbol reading device according to claim 12, wherein said plurality of inclined surfaces incline by a predetermined angle with respect to said symbol reading surface.

14. The symbol reading device according to claim 13, wherein said plurality of inclined surface are arranged in a longitudinal direction of said casing, and extending in a direction perpendicular to said longitudinal direction.

15. The symbol reading device according to claim 1, wherein surfaces of said optical element through which said light pass are flat and parallel to each other.

16. The symbol reading device according to claim 1, further comprising a filter which only allows light having a wavelength within said first predetermined wavelength range to pass through, said filter being inserted within an optical path between said optical element and said image receiving element.

17. The symbol reading device according to claim 1, wherein a surface of said symbol, said image receiving surface and said converging optical system are arranged such that the Scheimpflug rule is satisfied when said symbol reading device is positioned on said symbol.

18. The symbol reading device according to claim 17, further comprises image processing system which compensates distortion of the image, due to arrangement of said surface of said symbol, said image receiving surface and said converging optical system, formed on said image receiving surface.

19. A symbol reading device, comprising:

a casing, said casing having an opening defining a symbol reading area;

an image receiving element, said image receiving element receiving an image of an object and outputting an image signal corresponding to the received image; and an optical system, an image of a symbol to be read being formed on an image receiving surface of said image receiving element through said optical system when said symbol is located in said symbol reading area, a portion of said casing, on a surface opposite and parallel to said surface formed with the said opening, being formed with a window portion through which a symbol located at said symbol reading area is observable, said optical system including an optical element provided at said window portion, said optical element deflecting light having a wavelength within a first wavelength range and directing said deflected light to said image receiving element.

20. The symbol reading device according to claim 19, said optical element comprising a diffraction grating.

21. A symbol reading device, comprising:

a casing, said casing having an opening defining a symbol reading area and a window portion formed on a surface opposite and parallel to said opening;

an image capturing system, said image capturing system receiving light from an object and captures an image of said object; and a hologram lens provided at said window portion, a symbol located at said symbol reading area being observable through said hologram lens, said hologram lens deflecting light having a wavelength within a first wavelength range and directing said deflected light to said image capturing system.

* * * * *